(12) United States Patent
Foerster et al.

(10) Patent No.: US 8,643,346 B2
(45) Date of Patent: Feb. 4, 2014

(54) DEVICE AND METHOD FOR CONVERTING A POTENTIAL

(75) Inventors: Frank Foerster, Erlangen (DE); Peter Spies, Herzogenaurach (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 550 days.

(21) Appl. No.: 12/933,055

(22) PCT Filed: Mar. 17, 2009

(86) PCT No.: PCT/EP2009/001962
§ 371 (c)(1),
(2), (4) Date: Dec. 15, 2010

(87) PCT Pub. No.: WO2009/115298
PCT Pub. Date: Sep. 24, 2009

(65) Prior Publication Data
US 2011/0148369 A1    Jun. 23, 2011

(30) Foreign Application Priority Data

Mar. 17, 2008 (DE) .......................... 10 2008 014 622
May 2, 2008 (DE) .......................... 10 2008 021 875

(51) Int. Cl.
*G05F 1/613* (2006.01)
*G05F 1/40* (2006.01)

(52) U.S. Cl.
USPC .......................................... 323/225; 323/265

(58) Field of Classification Search
USPC .................... 323/222–225, 265, 268, 271
See application file for complete search history.

(56) References Cited

U.S. PATENT DOCUMENTS 6,713,894 B1    3/2004  Reimer et al.
6,744,236 B2 *  6/2004  Capel et al. .................. 320/101

(Continued)

FOREIGN PATENT DOCUMENTS

DE    19754964 A1    6/1999
EP    0706253 A      4/1996

(Continued)

OTHER PUBLICATIONS

Cegnar, E. et al.; "A Purely Ultracapacitor Energy Storage System for Hybrid Electric Vehicles Utilizing a Microcontroller-Based dc-dc Boost Converter"; Feb. 2004; IEEE Applied Power Electronics Conference; pp. 1160-1164.

Gao, L. et al.; "Active Power Sharing in Hybrid Battery/Capacitor Power Sources"; Feb. 2003; IEEE Applied Power Electronics Conference, pp. 497-503.

(Continued)

*Primary Examiner* — Matthew Nguyen
(74) *Attorney, Agent, or Firm* — Michael A. Glenn; Perkins Coie LLP

(57) ABSTRACT

A potential converter device with a first storage capacitor implemented to be supplied with energy from an energy source to acquire a first potential form at the first storage capacitor, and a second storage capacitor implemented to be supplied with energy from the first storage capacitor to acquire a second potential form at the second storage capacitor. The potential converter device further has a converter electrically connected between the first and second storage capacitors and implemented to execute an energy transmission from the first storage capacitor to the second storage capacitor if the first potential form reaches a first potential threshold value and until the first potential form reaches a second potential threshold value, wherein the first potential threshold value is greater regarding its magnitude than the second potential threshold value.

22 Claims, 6 Drawing Sheets

(56) References Cited

U.S. PATENT DOCUMENTS

| | | | |
|---|---|---|---|
| 7,161,331 B2* | 1/2007 | Wai et al. | 323/222 |
| 7,566,828 B2 | 7/2009 | Sasaki | |
| 2010/0231178 A1* | 9/2010 | Handa et al. | 320/163 |
| 2010/0289452 A1* | 11/2010 | Wagatsuma et al. | 320/109 |

FOREIGN PATENT DOCUMENTS

| | | |
|---|---|---|
| EP | 1403143 A | 3/2004 |
| JP | 2005328662 | 11/2005 |
| JP | 2007312558 | 11/2007 |

OTHER PUBLICATIONS

Siemens; "General-Purpose Power Controller (GPPC)"; Dec. 1992; retrieved online from: www.datasheetcatalog.com; 14 pages.

Siemens; "SMPS-IC with MOSFET Driver Output"; May 1996; 27 pages.

Texas Instruments; "UNITRODE Primary Side PWM Controller"; Apr. 1997; 9 pages.

English Translation of the ISR, dated Jun. 22, 2009, in related PCT application No. PCT/EP2009/001962, 3 pages.

English Translation of the IPRP, dated Dec. 8, 2010, in related PCT application No. PCT/EP2009/001962, 3 pages.

\* cited by examiner

DEVICE AND METHOD FOR CONVERTING A POTENTIAL

CROSS-REFERENCE TO RELATED APPLICATION

This application is a U.S. National Phase entry of PCT/EP2009/001962 filed Mar. 17, 2009, and claims priority to German Patent Application No. 10 2008 014 622.6 filed Mar. 17, 2008 and German Patent Application No. 10 2008 021 875.8 filed May 2, 2008, each of which is incorporated herein by references hereto.

BACKGROUND OF THE INVENTION

The present invention relates to a potential converter device and to a method for converting a potential, as is, for example, present in switching regulators or voltage regulators. In particular, the potential converter device and the method for converting a potential may be used in power management applications for sources of low continuous power output, such as, for example, in thermogenerators or piezoconverters which may comprise a low power output of, for example, 0.5 watts.

The technological field of application of the invention described here advantageously is a potential converter device the power input of which remains unchanged, whereas the energy consumption thereof may decrease compared to a conventional potential converter device.

With an energy source of very low energy efficiency, a switching regulator may, when used, take up nearly the same amount of power as is output by the energy source. In conventional power management concepts, individual functional blocks are usually switched on and off by separate voltage regulators, for example. The energy source needs to provide a sufficient amount of current so as to provide at least the control unit needed for controlling and monitoring and the voltage regulator with energy. This means that, in regular operation, part of the source energy will be used up by power management.

Conventional potential converter devices and/or switching regulators themselves consume part of the energy which they are to convert. When an energy source provides approximately the same amount of energy as the switching regulator consumes, an insufficient amount of energy will be available at the output for the actual load.

Potential converter devices may exemplarily be employed in battery-fed apparatuses in which electronics of an application need a higher voltage compared to a battery voltage, as is exemplarily the case in notebook computers, mobile phones or photo flashlight devices. Further examples of the usage of such potential converter means are transmitting measured values of sensors, such as, for example, temperature sensors in an oven, for transmitting temperature values and/or pressure values.

SUMMARY

According to an embodiment, a potential converter device may have a first storage capacitor implemented to be supplied with energy from an energy source to acquire a first potential form at the first storage capacitor; a second storage capacitor implemented to be supplied with energy from the first storage capacitor to acquire a second potential form at the second storage capacitor; a converter electrically connected between the first and the second storage capacitors and implemented to execute an energy transmission from the first storage capacitor to the second storage capacitor if the first potential form reaches a first potential threshold value until the first potential form reaches a second potential threshold value, and wherein the first potential threshold value is greater regarding its magnitude than the second potential threshold value; and a controller which is implemented to temporally control the energy transmission of the converter means from the first storage capacitor to the second storage capacitor by activating and deactivating the converter means, so that the first storage capacitor is charged in a first time period during which the converter means is deactivated and whose starting time is given by reaching the second potential threshold value and whose end time is given by reaching the first potential threshold value, in the first potential form, and wherein the converter means is implemented to execute the energy transmission only in a second time period during which the converter means is activated and whose starting time is given by reaching the first potential threshold value and whose end time is given by reaching the second potential threshold value, in the first potential form, wherein the ratio of the first time period to the second time period is greater than 5.

According to another embodiment, a method of potential conversion may have the steps of supplying energy from an energy source to a first storage capacitor in a first time period, whose starting time is given by reaching a second potential threshold value and whose end time is given by reaching a first potential threshold value, in the first potential form, to acquire a first potential form at the first storage capacitor; supplying energy from the first storage capacitor to a second storage capacitor to acquire a second potential form at the second storage capacitor; and transmitting the energy with a converter means electrically connected between the first and the second storage capacitor, from the first storage capacitor to the second storage capacitor, if the first potential form reaches a first potential threshold value and until the first potential form reaches a second potential threshold value, and wherein the first potential threshold value is greater regarding its magnitude than the second potential threshold value, wherein the transmission is executed in a second time period whose starting time is given by reaching the first potential threshold value and whose end time is given by reaching the second potential threshold value, in the first potential form, wherein the converter means is deactivated during the first time period and activated during the second time period, and wherein the ratio of the first time period to the second time period is greater than 5.

The present invention provides a potential converter device comprising a first storage capacitor S1 implemented to be supplied with energy from an energy source to acquire a first potential form at the first storage capacitor S1, and a second storage capacitor S2 implemented to be supplied with energy from the first storage capacitor S1 to acquire a second potential form at the second storage capacitor S2. In addition, the potential converter device comprises a converter means electrically connected between the first and second storage capacitors and implemented to execute an energy transmission from the first storage capacitor S1 to the second storage capacitor S2 in case the first potential form reaches a first potential threshold value P1 and until the first potential form reaches a second potential threshold value P2, wherein the first potential threshold value P1 is greater regarding its magnitude than the second potential threshold value P2.

Additionally, the present invention provides a method of potential conversion. The method comprises supplying energy from a source of energy to a first storage capacitor S1 to acquire a first potential form at the first storage capacitor S1. In addition, the method comprises supplying energy from the first storage capacitor S1 to a second storage capacitor S2 to acquire a second potential form at the second storage capacitor S2. The method of converting a potential additionally comprises transmitting energy with a converter means electrically connected between the first and second storage capacitors, from the first storage capacitor S1 to the second storage capacitor S2 in case the first potential form reaches a first potential threshold value P1, and to stop the transmission of energy in case the first potential form reaches a second potential threshold value P2, the first potential threshold value P1 being of a greater magnitude than the second potential threshold value P2.

Embodiments of the present invention are of advantage in that the power input of a potential converter device remains unchanged, however the energy consumption thereof decreases significantly since the potential converter device transmits the energy from the storage capacitor S1 to the storage capacitor S2 during a shorter period of time than during another longer period of time in which the storage capacitor S1 is supplied with energy from a source of energy. In embodiments of the method for converting a potential and/or the potential converter device, considerably higher an efficiency can be achieved by a higher power during the short transmission of energy from the first storage capacitor S1 to the second storage capacitor S2, compared to a continuous transmission of energy of the power of the source of energy, which is many times lower, to the storage capacitor S1.

In embodiments of the present invention, a first energy storage element of the potential converter device is supplied with energy from a source of energy. Using a converter means, the energy is transmitted to a second energy storage element of the potential converter device when reaching a first threshold energy value, the energy in the first energy storage element decreasing. When reaching a second threshold energy value at the first energy storage element, the converter means is disabled so that energy is no longer transmitted, until the first threshold energy value is exceeded or reached again by the supply with energy from the source of energy to the first energy storage element.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
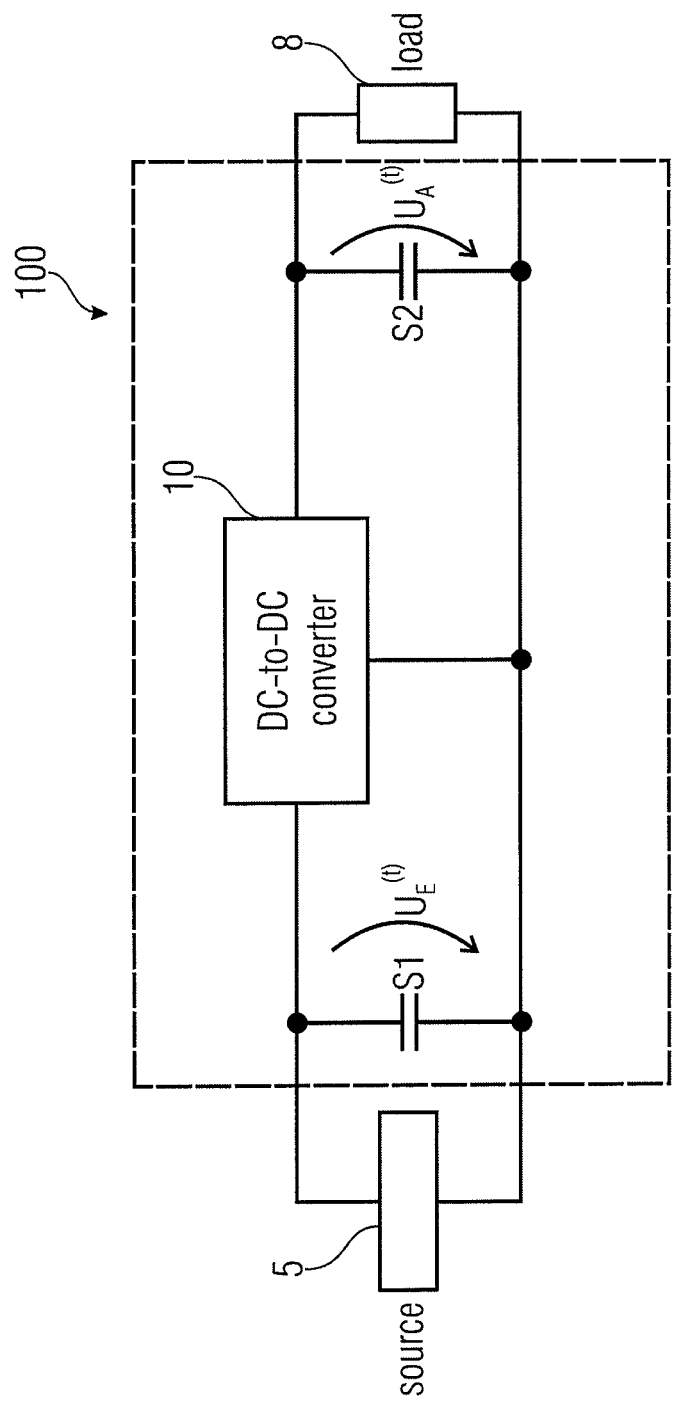
FIG. 1 shows a schematic block diagram of a potential converter device in accordance with an embodiment of the present invention.

With regard to the following description of embodiments of the present invention, it should be kept in mind that, to simplify matters, the same reference numerals will be used for functionally identical elements and equivalent elements having the same effect or the same function in different figures throughout the description.

FIG. 1 shows a basic block circuit diagram of an embodiment of a potential converter device 100 in accordance with the present invention which will subsequently be discussed referring to FIG. 2. The potential converter device 100 in FIG. 1 comprises a first storage element, exemplarily a storage capacitor S1, implemented to be supplied with energy from a source of energy 5 to acquire a first potential form at the first storage capacitor S1. The potential converter device 100 in FIG. 1 additionally comprises a second storage element, exemplarily a second storage capacitor S2, implemented to be supplied with energy from the storage capacitor S1 to acquire a second potential form at the second storage capacitor S2. The potential converter device 100 in FIG. 1 additionally comprises a converter means 10 which may exemplarily be a DC-to-DC converter, electrically connected between the first and second storage capacitors S1 and S2 and implemented to transmit energy from the first storage capacitor S1 to the second storage capacitor S2 in case the first potential form reaches a first potential threshold value P1 and until the first potential form reaches a second potential threshold value P2, the first potential threshold value P1 being of a greater magnitude than the second potential threshold value P2. Continuous supply of a load 8 will be possible when the second storage capacitor S2 is of sufficient dimensions.

The converter means 10 or the switching regulator is designed so as to start, starting at a defined upper voltage threshold—the first potential threshold P1 relative to a reference potential—at the input, to transfer energy from the first storage capacitor S1 to the second storage capacitor S2 at the output of the converter means. Exemplarily, the second storage capacitor S2 may be charged to a higher potential or, relating to a reference potential, to a higher voltage following the principle of a step-up converter or up-converter. This higher voltage may then be tapped by a load 8 or be applied to a load 8.

When reaching a second potential threshold value P2, or a second lower threshold voltage, the switching regulator 10 may cease to operate. This means that energy is no longer transmitted actively from the storage capacitor S1 to the storage capacitor S2. The potential form or, relating to a reference potential, the voltage tappable at the first storage capacitor S1 decreases due to the energy transmission or energy transfer from the first storage capacitor S1 to the second storage capacitor S2 using the converter means. During that period of time when no energy is transmitted from the storage capacitor S1 to the storage capacitor S2 by the converter means 10, the converter means or switching regulator does not take up any power. During that period of time, all the energy provided by the source 5 may flow to the first storage capacitor S1. When reaching the upper threshold—the first potential threshold value P1—energy transmission from the first to the second storage capacitor by the converter means 10 may start again. The result of implementing a first potential threshold value and a second potential threshold value, or an upper and lower threshold voltage, is a hysteresis behavior in the converter means 10.

In accordance with embodiments of the present invention, the converter means 10 may be configured to form, by the energy transmission or energy transfer from the first storage S1 to the second storage S2, a maximum potential, of a greater magnitude, $P_2^{max}$ at the second storage S2 than a maximum potential $P_1^{max}$ at the first storage S1 which is formed by being supplied with energy from the source of energy 5. Thus, a maximum tappable output voltage $U_A^{max}$ at the storage S2 may be greater than a maximum tappable input voltage $U_E^{max}$ made available at the first storage S1 of the converter means, relative to a common reference potential. In other words, due to the up-conversion, a greater voltage than a source 5 makes available can be made available to a load 8.

This means that, using the converter means 10, the potential converter device 100 is able to convert a source voltage of a source of energy 5 to a higher output voltage. A converter means of this kind may be realized in different ways. Up-converters are employed in many battery-fed apparatuses in which electronics of an application need a higher voltage than may be provided, for example, by a battery acting as a source.

The converter means 10 may exemplarily be a direct voltage converter, such as, for example, a step-up converter. The converter means here may be configured such that, in clocked operation, energy is transported in portions from an input side, i.e. the first storage capacitor S1, to the output side, i.e. the storage capacitor S2. The converter means 10 may comprise a switch or power switch, an energy storage and a smoothing capacitor. The tappable voltages or the second potential form at the storage capacitor S2 may differ in their course and in size and are, among other things, dependent on the load 8 and the energy extracted by the load and the respective RC time constants. This applies to both the output side and the input side where the RC constant of the storage capacitor S1 together with the source 5 is decisive for the first potential time form. The converter means 10 may be an inductive converter which uses an inductivity for temporarily storing the energy transmitted from the storage capacitor S1 to the storage capacitor S2, wherein the inductivity may be implemented as a coil or, for example, as a converting transformer. However, it is also conceivable for the converter means 10 to be implemented as a capacitive converter in which the energy to be stored temporarily is stored capacitively. Capacitive converters of this kind are also referred to as charge pumps. The converter means 10 may exemplarily also be implemented as a DC-to-DC converter containing a transformer and exhibiting potential separation between an input side of the converter means 10 and an output side of the converter means 10. There may be galvanic separation between the input and output sides and thus between the input voltage at the storage capacitor S1 and the output voltage tappable by a load at the storage capacitor S2. Using switch-mode power supplies serving as a converter means 10 is also conceivable.

In another embodiment, the potential converter device 100 may comprise a converter means 10 additionally configured to stop transmitting energy from the first storage capacitor S1 to the second storage capacitor S2 in case the second potential form at the second storage capacitor S2 reaches a third potential threshold value P3. In other words, the converter means 10 may be configured such that it will stop further transmission of energy from the storage capacitor S1 to the storage capacitor S2 in case a predetermined output voltage is tappable at the storage capacitor S2. Thus, the potential converter device can be prevented from being destroyed in open-circuit operation during which no energy is taken from the storage capacitor S2 by a load and consequently the output voltage $U_A$ may increase in an unregulated manner.

In embodiments of the present invention, the converter means 10 of the potential converter device 100 may comprise a feedback loop or feedback means coupled to the converter means such that the transmission of energy from the first storage capacitor S1 to the second storage capacitor S2 is stopped when a predetermined output voltage $U_A$, relative to a reference potential, is tappable at the second storage capacitor S2.

Figure 2:
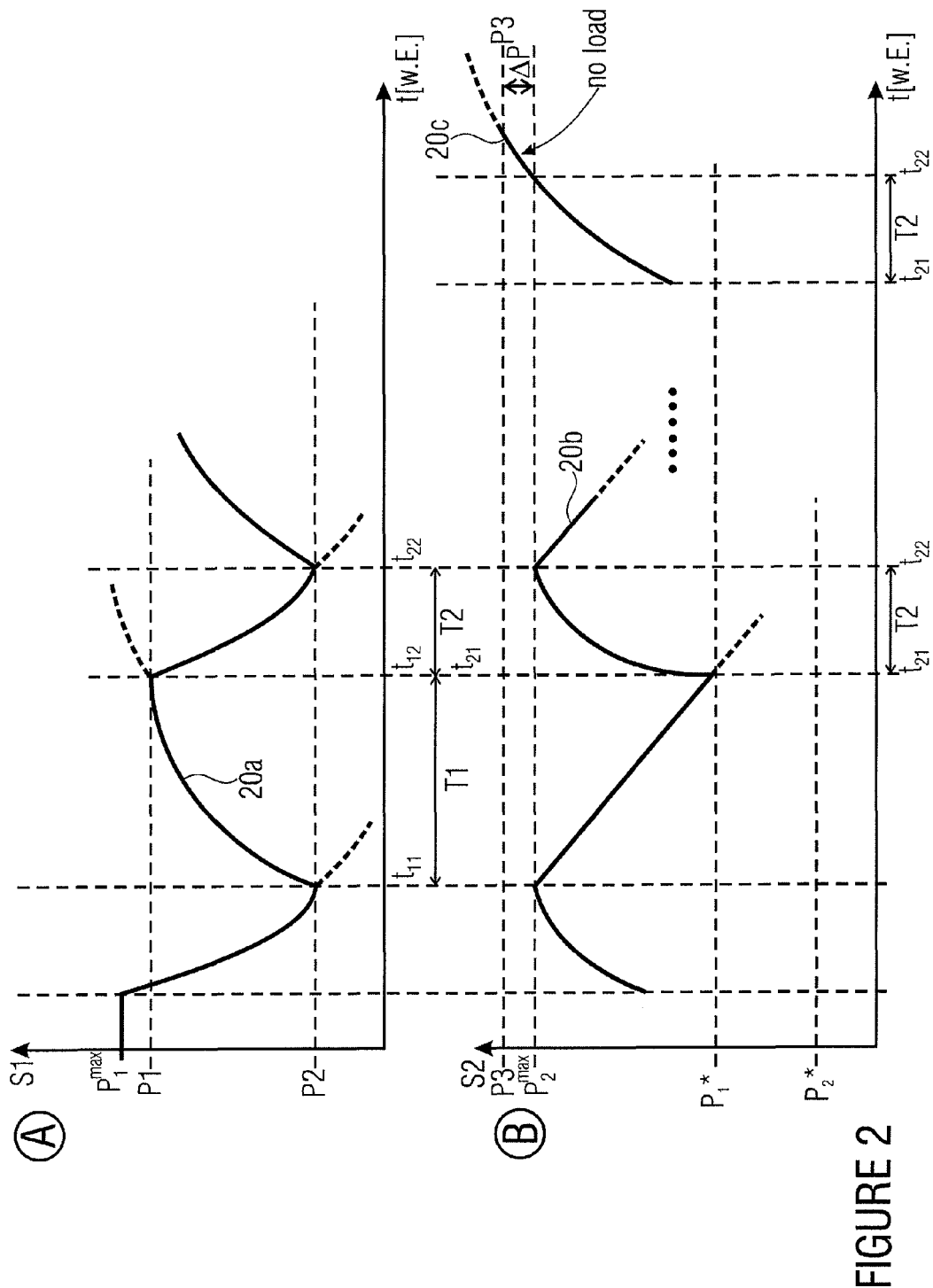
FIG. 2 shows a schematic time chart for illustrating the mode of functioning of the potential converter device in accordance with an embodiment of the present invention.

A schematic time chart in FIG. 2 illustrates the mode of functioning of the potential converter device and the method for converting a potential schematically. On the one hand, the first potential form 20a of the first storage capacitor S1 is illustrated schematically in FIG. 2 in a chart A, and the second potential form 20b of the second storage capacitor S2 in a second chart B. The time form of the first and second potential forms 20a and 20b in any units is plotted on the x-axis of both charts. The respective potentials—or relating to a reference potential, such as, for example, ground—the voltage values at the first storage capacitor S1 and the second storage capacitor S2 are plotted on the y-axes of the two charts A and B. The potential converter device may operate cyclically or periodically and be divided into charging and discharging time portions. Exemplarily, starting with a situation in which the first storage capacitor S1 is charged by a source of energy to a maximum potential value $P_1^{max}$ which is determined by the source of energy and may be higher than or identical to the first potential value P1, the second storage capacitor S2 (chart B) is charged up to a maximum potential value $P_2^{max}$. This may exemplarily be performed by a converter means implemented as an up-converter so that the maximum potential value $P_2^{max}$ is greater than the maximum potential value $P_1^{max}$. Caused by the transmission of the converter means, the potential or voltage at the first storage capacitor S1 (chart A) decreases until the first potential form graph 20a reaches the second potential threshold value P2 at a time $t_{11}$. When reaching the lower potential threshold value P2, the converter means 10 ceases operating and consequently no longer transmits energy from the storage capacitor S1 to the storage capacitor S2. Starting at the time $t_{11}$, all the energy (i.e. the charge of the source 5 (see FIG. 1)) will again flow to the first storage S1. The first storage capacitor S1 is then charged in a manner dependent on, among other things, the RC constant thereof. As soon as the first potential form 20a reaches the first potential threshold value P1 at a time $t_{12}$, energy is transmitted from the storage capacitor S1 to the second storage capacitor S2 by the converter means. The first storage capacitor S1 is thus charged by the source of energy in a first period of time T1 the starting time $t_{11}$ of which is determined by reaching the second potential threshold value P2 and the end time $t_{12}$ of which is determined by reaching the first potential threshold value P1 in the first potential form 20a. During that time, energy can be taken from the second storage capacitor S2, as can be gathered from the second potential form graph 20b (chart B), in dependence on a load 8 connected. In the example of FIG. 2, a load exhibits a linear power consumption. As can be gathered from the second potential form graph 20b, at a time $t_{21}$ which may correspond to the time $t_{12}$, energy is transmitted from the first storage capacitor S1 to the second storage capacitor S2. At this time, the second storage capacitor S2 has a potential $P_1^*$. When falling below a potential $P_2^*$ at the second storage capacitor S2, a load connected to the second storage capacitor would no longer function. Due to the energy transmission, the second potential form graph 20b may, depending on the precise mode of functioning of the converter means, increase faster than the first potential form graph 20a in the first period of time T1. Due to the energy transfer, the first potential form graph 20a at the first storage capacitor S1 decreases again during the second period of time T2. The end time $t_{22}$ of the second period of time T2 is again determined by reaching the second potential threshold value in the first potential form graph 20a. This means that the respective first periods of time T1 and the respective second periods of time T2 may be of different lengths compared to one another. When falling below the potential $P_2^*$ at the storage capacitor S2, the load may be inactive and, after transmitting energy from the first to the second storage capacitor, exemplarily starting at a potential value $P_1^*$ at the storage capacitor S2, start operating again or consuming energy. In case the source of energy is only able to provide a limited amount of energy to the first storage capacitor S1, the load, when falling below the potential $P_2^*$ and after subsequently transmitting energy, may start operating again or consuming energy in case the voltage on the secondary side (output side) is again above a starting voltage typical of the specific load. The process of switching off the load when falling below the potential $P_2^*$ at the second storage capacitor S2 and restarting when exceeding the starting voltage of the load at the second storage capacitor S2 may exemplarily repeat cyclically or in aperiodic periods of time.

The potential form graph 20c exemplarily illustrates the situation in which no load takes energy from the second storage capacitor S2 and the converter means continues to transmit energy from the first storage capacitor S1 to the second storage capacitor S2. The potential converter device may exemplarily comprise a control means or feedback means configured so as to stop transmitting energy from the first storage capacitor S1 to the second storage capacitor S2 in case a third potential threshold value P3 is reached. The difference $\Delta P$ between the maximum potential value $P_2^{max}$ and P3 may equal zero, i.e. they are identical, or be unequal to zero.

Generally, the method for converting a potential and the potential converter device in this embodiment are based on the fact that, in a certain period of time, exemplarily the first period of time T1, energy is collected in the storage capacitor S1 and then transferred to the output side of the converter means, i.e. to the second storage capacitor S2 using the converter means faster many times over and at higher electrical power. When energy is transmitted, at the same time a voltage is up-converted. While a maximum potential $P_1^{max}$ which is determined by the source of energy 5 and may be identical to P1 may be reached on the input side, i.e. at the first storage capacitor S1, a greater potential $P_2^{max}$ and thus a higher output voltage $U_A^{max}$ which may be made available to a load may form on the output side, depending on the converter means. During the time, i.e. exemplarily in the first period of time T1, in which no energy is transmitted from the first storage capacitor S1 to the second storage capacitor S2 by the converter means since the converter means is switched off, a load may be supplied with energy in a continuous manner when the second storage capacitor S2 is dimensioned in a suitable manner. As can be gathered from the second potential form graph 20b, the potential of the second storage capacitor S2 decreases in dependence on the consumption. Assuming a load to comprise a load resistance R, the RC time constant of the storage capacitor S2 may be configured such that the output voltage $U_A$ does not fall below the second potential P2 in the first period of time T1, although energy is taken up by the load.

As can further be gathered from FIG. 2, the periods of time T1 and T2 may repeat themselves cyclically or periodically, a converter means transmitting energy from the storage S1 to the storage S2 during the period of time T2 and not doing so during the first period of time T1. This means that, after transmitting the energy, i.e. at the end time $t_{22}$ of the energy transmission, a time pause may result in which the converter means is inactive and thus does not itself take up or consume any power. This decreases the load portion of the converter means in the overall energy consumption of the potential converter device. This means that the power input of the converter means remains unchanged, however the energy consumption thereof decreases significantly since it is only active for a short time, during the energy transfer. Consequently, the potential converter device presented here is able to consume less energy than conventional potential converter devices.

Embodiments in accordance with the present invention comprise potential converter devices in which a first storage capacitor S1 is charged in a first period of time T1 the starting time $t_{11}$ of which is determined by reaching the second potential threshold value P2 and the end time $t_{12}$ of which is determined by reaching the first potential threshold value P1 in the first potential form, and in which the converter means is configured to only transmit energy in a second period of time T2 the starting time $t_{21}$ of which is determined by reaching the first potential threshold value P1 and the end time $t_{22}$ of which is determined by reaching the second potential threshold value P2 in the first potential form. The second period of time T2 may be shorter than the first period of time T1 and, thus, the converter means may only actively take up electrical power during the shorter period of time T2 and not so during the longer first period of time T1. This allows improving an efficiency $\eta = P_{output}/P_{input}$ compared to a conventional potential converter device. The efficiency $\eta$ of the potential converter device may in some embodiments be exemplarily 70% to 80% or greater than 80%.

In embodiments of the present invention, the ratio of the first period of time T1 and the second period of time T2 may exemplarily be between 10 and 500, between 100 and 400 or be greater than 5 or greater than 10. The first period of time T1 may in one embodiment exemplarily be 100 ms and the second period of time T2 be 2 ms.

Figure 3:
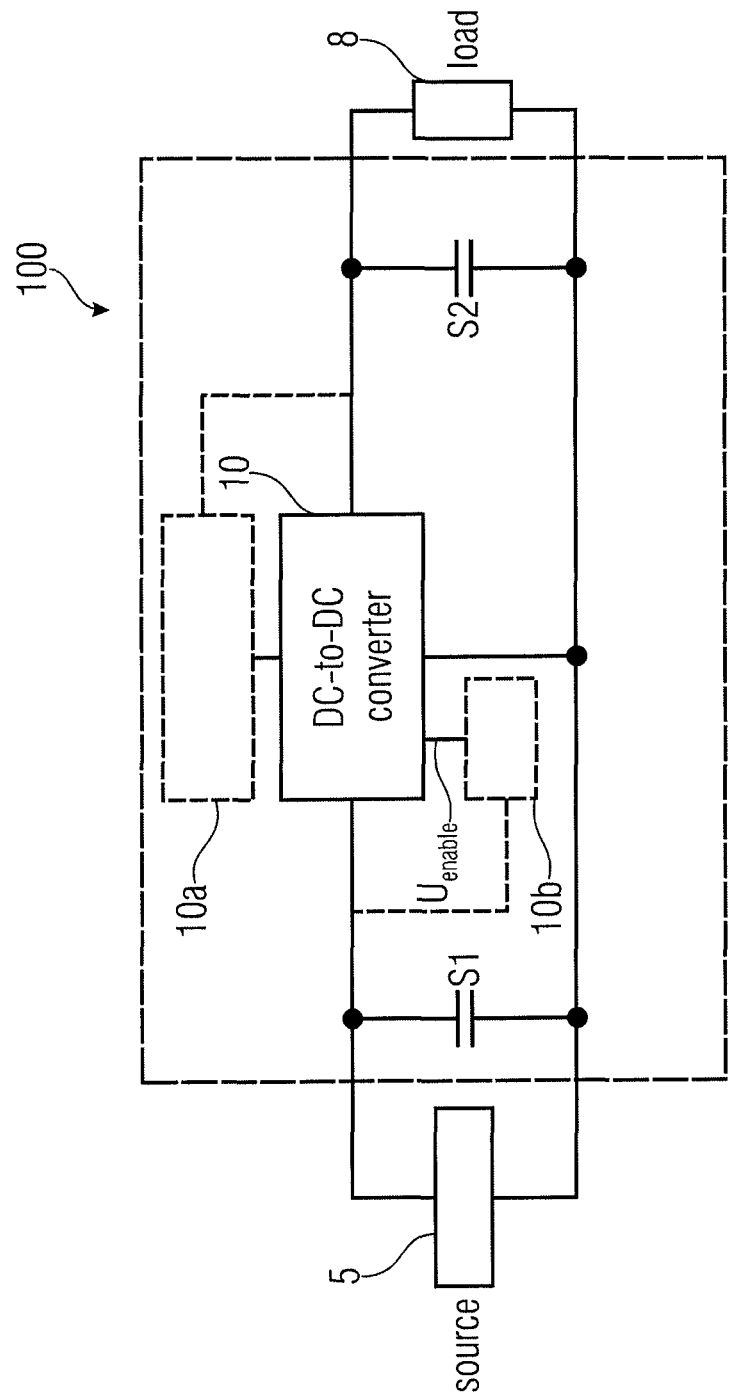
FIG. 3 shows another basic block circuit diagram of a potential converter device comprising a control means and feedback unit in accordance with another embodiment of the present invention.

FIG. 3 illustrates another embodiment of the present invention of a potential converter device schematically. The potential converter device 100 may, as has been described in connection with FIG. 1, comprise a first storage capacitor S1 and a second storage capacitor S2 which may be connected electrically to a source 5 and a load 8, respectively, and a converter means 10 coupled between S1 and S2. The converter means 10 may additionally comprise a feedback means or feedback loop 10a coupled to the converter means such that the transmission of energy from the storage capacitor S1 to the storage capacitor S2 is stopped when, relative to a reference potential, a predetermined output voltage $U_A$ is tappable by a load 8 at the second storage capacitor S2. The potential converter device 100 may additionally comprise a control means 10b, wherein the control means may exemplarily be a comparator hysteresis circuit or a Schmitt trigger circuit configured to cause energy to be transmitted from the first storage capacitor S1 to the second storage capacitor S2 by switching on the converter means 10 in case a voltage value determined by a current potential value of the first potential form relative to a reference potential is greater than a first threshold voltage value U1 determined by the first potential threshold value P1 compared to the reference potential. The control means 10b may additionally be configured to switch off the converter means 10 to stop the transmission of energy from the first storage S1 to the second storage capacitor S2 in case a voltage value determined by a current potential value of the first potential form graph relative to a reference potential is smaller than a second threshold voltage value U2 determined by the second potential threshold value P2 relative to the reference potential. The control means 10b may switch on and off the DC-to-DC converter 10 using the voltage $U_{enable}$ when reaching the respective threshold voltage values. In accordance with one embodiment, the first threshold value voltage U1 may exemplarily be 1.0 V, the second threshold value voltage U2 may be 0.3 V and the output voltage $U_A$ may be 3 V.

It should be pointed out that the potential values may be both positive potential values and negative potential values or positive or negative voltage supplies and that the magnitude of the potential values or potential threshold values should be used as a basis.

Figure 4:
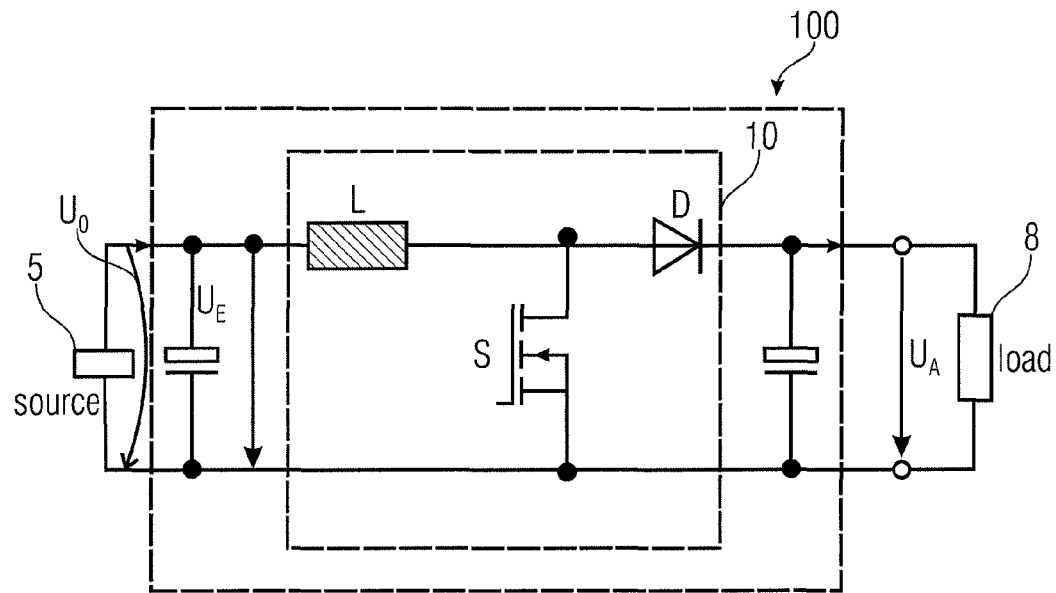
FIG. 4 shows a circuit of a converter means of the potential converter device in accordance with an embodiment of the present invention.

In accordance with the embodiment in FIG. 4, the potential converter device 100 may comprise an up-converter circuit as a converter means 10. A voltage source 5 may exhibit an open circuit voltage $U_0$ and a high internal resistance so that, in an unloaded state, the output voltage of the voltage source corresponds to the open-circuit voltage $U_0$ and the storage capacitor S1 connected is charged correspondingly. The storage capacitor S1 may additionally be connected to an inductivity, exemplarily a coil L. The inductivity L may be connected in series to a diode D downstream of which a second storage capacitor S2 sums up an output voltage $U_A$ which may be taken up from the second storage capacitor S2 by a consumer or load. The inductivity L may be connected to ground via a switch S which may be implemented as a transistor. The switch S or the transistor may be controlled via a control means 10b (not shown in FIG. 4) and/or via a feedback means 10a.

When the switch is open or the transistor is blocking, a current flows from the first storage capacitor S1 through the coil L, through the forward-biased diode, and charges the second storage capacitor S2. The second storage capacitor S2 is consequently charged to the value of the input voltage $U_E$ tappable from the first storage capacitor S1. Due to the transmission of energy from the first storage capacitor S1 to the second storage capacitor S2, the voltage at the first storage capacitor S1 decreases. When the switch S is closed or the transistor connected through, a current flows from the first storage capacitor S1 via the switch S towards ground. The resulting current flow is determined by the inductivity L and the ohmic resistances of the coil and the transistor. The diode D is blocking in this state, and consequently the second storage capacitor S2 is not discharged. This means that the output voltage $U_A$ at the second storage capacitor is kept. In case the switch is opened or the transistor blocking again, the coil current in the inductivity cannot change instantaneously, but at first its quantity and flow direction remain the same. Since the switch is blocked, a current flows through the diode and thus continues to charge the second storage capacitor S2. Since the second storage capacitor S2 is already at the potential value of the first storage capacitor S1, by the further charge applied on the second storage capacitor S2 the potential value thereof is formed to be above the potential value of the first storage capacitor. This means that a higher output voltage can be made available at the second storage capacitor S2 than is tappable from the first storage capacitor S1. Switching the switch S on and off in a clocked manner during the second period of time T2 for transmitting energy by the converter means may exemplarily be performed using an impulse width modulator. The output voltage $U_A$ tappable at the second storage capacitor may depend on the duty cycle, i.e. the ratio between the time when the transistor is switched on during the second period of time T2, and the time when the transistor is switched off during the second period of time T2. Switching the transistor or the switch S on and off in a clocked manner during the second period of time T2 may exemplarily be done at a frequency of 1 kHz to 5 MHz, i.e. exemplarily at 100 kHz. During the first period of time T1, the switch S may, in accordance with embodiments of the invention, be disabled. In accordance with another embodiment, the converter means may be configured such that it keeps the output voltage $U_A$ constant by reducing the duty cycle for the transmission of energy or adjusting same to the energy taken from the second capacitor S2 by a load or by stopping the conversion in case a load does not take any energy from the second storage or capacitor S2.

During clocked operation, energy is transmitted from the first storage capacitor S1 to the second storage capacitor S2 in portions. This means that the clocked operation for up-converting the voltage and for transmitting energy may in embodiments only be performed during the second period of time T2 (see FIG. 2). Only in the second period of time T2 does the converter means 10, i.e., exemplarily, the up-converter as described in FIG. 4, actively consume energy. In this interval (second period of time T2), there is only a power loss which reduces the overall energy balance of the potential converter device or the efficiency of the potential converter device. In contrast to continuously operating converter means, power loss is reduced by operating the converter means. The circuit for high-frequency clocking the switch for up-conversion may be part of the feedback means 10a (FIG. 3). In the feedback means 10a, the high-frequency clock signal for the converter means 10 may be generated during the period of time T2. The control means 10b in contrast may switch on and off the converter means 10 when reaching the corresponding potential or voltage threshold values.

In one embodiment of the present invention, the converter means is implemented as an up-converter, wherein an inductivity L which is given by the current potential value of the first potential form from the first storage capacitor S1 compared to a reference potential, is connected to an input voltage $U_E$ via a first connection point. The second connection point of the inductivity L is, on the one hand, connected in parallel to a switch S connected to the reference potential and, on the other hand, connected to a diode D which is forward-biased and connected to the second storage capacitor S2.

In embodiments of the present invention, the converter means may comprise a switch S implemented as a transistor which is switched on by a comparator circuit including hysteresis or a Schmitt trigger circuit when reaching a first threshold voltage U1 and is switched off by the Schmitt trigger circuit or the comparator circuit including hysteresis when reaching a second threshold voltage U2.

In accordance with another embodiment of the potential converter device, the a converter means 10 may be configured such that, when transmitting energy from the first storage capacitor S1 to the second storage capacitor S2, the second potential form at the second storage capacitor S2 reaches a maximum potential value $P_2^{max}$ being of a greater magnitude than a maximum potential value $P_1^{max}$ of the first potential form at the first storage capacitor S1 which is based on being supplied with energy from the source of energy.

In embodiments of the present invention, the converter means may exemplarily be implemented as a charge pump, as a linear voltage regulator, as a switching regulator, as a switch-mode power supply or as a DC-to-DC converter.

Figure 5A:
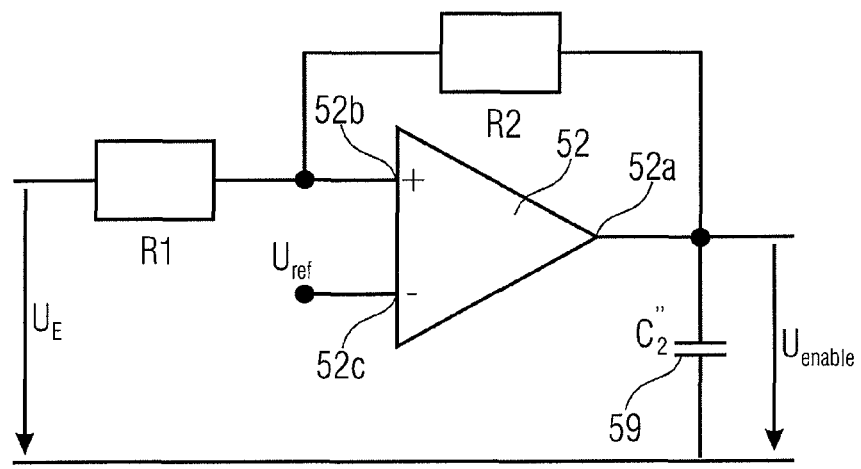
FIG. 5a shows a comparator hysteresis circuit for a control means of the potential converter device in accordance with an embodiment of the present invention.

In FIG. 5a, as a further embodiment, a Schmitt trigger circuit or a comparator hysteresis circuit is illustrated, as it may be used in a control means for the converter means of the potential converter device. A control means 10b may be integrated internally in the potential converter device or also in the converter device or may supply its control signals from outside the potential converter device. The Schmitt trigger circuit in FIG. 5a may be configured to switch on a converter means of the potential converter device to execute the energy transmission from the first storage capacitor S1 to the second storage capacitor S2 if a voltage value given by a current potential value of the first potential form as compared to a reference potential is higher regarding its magnitude than a first threshold voltage value U1 given by the first potential threshold value P1 as compared to the reference potential. The Schmitt trigger circuit in FIG. 5 may apart from that be configured to switch off the converter means to terminate the energy transmission from the first storage capacitor S1 to the second storage capacitor S2 if a voltage value given by a current potential value of the first potential form as compared to the reference potential is smaller regarding its magnitude than a second threshold voltage value U2 given by the second potential threshold value P2 as compared to the reference potential. The Schmitt trigger circuit of FIG. 5a comprises an operation amplifier 52, wherein the output of the operation amplifier 52a is coupled back via a resistance R2 connected to the non-inverting input of the operation amplifier. A further resistance 56 is connected upstream from the non-inverting input 52b. The inverting input 52c is placed onto the reference potential $U_{ref}$. Depending on the resistances R2 and R1, with a positive feedback different switching thresholds result for a rising or a falling input signal. The Schmitt trigger circuit is to be regarded as a switch, which in contrast to a simple transistor not only comprises one switching threshold but two defined switching thresholds, one each for the falling and for the rising edge. For the respective voltage thresholds, the resistances R2 and R1 are responsible. It applies here for the comparator circuit with a hysteresis in FIG. 5a, that the ratio of input voltage $U_E$ to output voltage $U_{enable}$ corresponds to the ratio of the resistance R2 to the resistance R1. The hysteresis and/or the coupling degree and the distance between the upper threshold voltage value U1 and the lower threshold voltage value U2 may thus depend on the resistance values R1 and R2 or on their ratios and on the voltages $U_E$ and $U_{enable}$.

The comparator/hysteresis circuit may thus provide an output voltage $U_{enable}$ using which a converter means 10 (FIG. 3) is switched on at the beginning of a time period T2 and switched off at the end of the time period T2.

The Schmitt trigger circuit or comparator hysteresis circuit may further comprise a capacity element 52 having a capacity value C"2, arranged between the comparator output 52a and the corresponding reference potential of the circuit. The capacity element 59 may serve as a delay member, i.e. for a temporal delay of the switching process at the converter means 10, which is controlled by the comparator hysteresis circuit. When falling below the bottom threshold value voltage, for example the converter means 10 which is switched on and off by the comparator hysteresis circuit, is not directly switched off but remains active and switched on for some time due to the buffering effect of the capacitor C"2.

The reference voltage $U_{ref}$ advantageously comprises a voltage value lying between an upper threshold voltage value U1 of the input voltage $U_E$ and a lower threshold voltage value U2 of the input voltage $U_E$. With an upper threshold voltage value U1 of for example 1.5V and a lower threshold voltage value U2 or for example 0.5 V, the reference voltage $U_{ref}$ may for example be 1.0 V. For the output voltage $U_{enable}$, for example when falling below the lower threshold voltage value U2, a voltage value of 0V, and when exceeding the upper threshold voltage value U1, a voltage value of 2 V may result.

In embodiments of the present invention, thus the control means may comprise a comparator circuit including a hysteresis (comparator hysteresis circuit) for example comprising an operation amplifier having a positive feedback resistance R2 and a second resistance R1. The comparator circuit with hysteresis may thus be implemented so that, being a voltage threshold value switch, it switches on the converter means (for example FIG. 3) when reaching the first threshold value voltage U1 and switches off the same when reaching the second threshold value voltage U2.

Figure 5B:
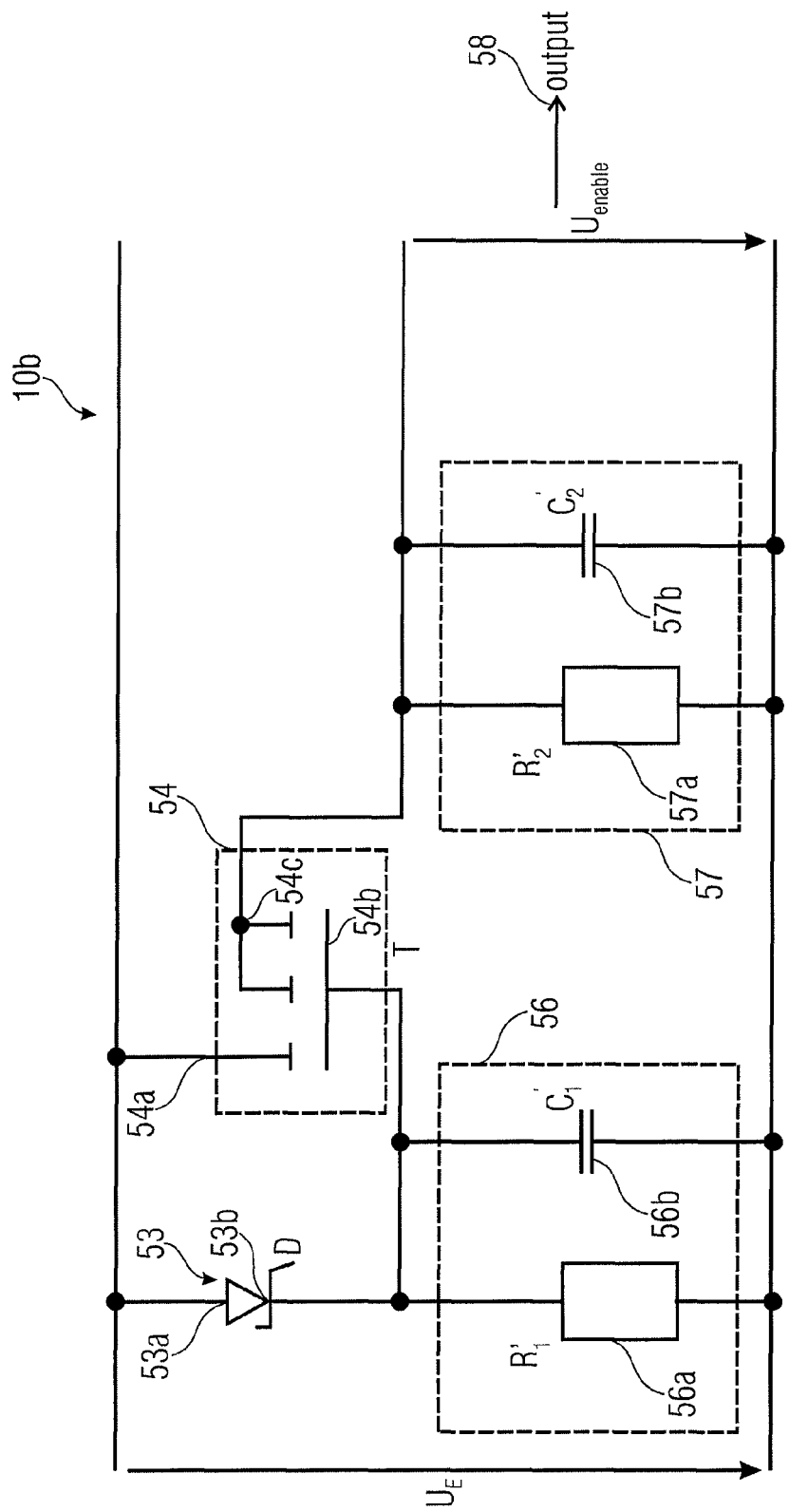
FIG. 5b shows another embodiment of a control means of the potential converter device.

FIG. 5b shows a further embodiment of a control means 10b for switching a converter means. The control means 10b may switch a converter means having a corresponding control input for example so that the converter means is inactive in the time period T1 indicated in FIG. 2 and active in the time period T2. I.e., when reaching a first potential threshold value P1 or, with relation to a reference potential, of a voltage threshold value U1, the converter means is activated by the control means 10b of FIG. 5b. For example, the converter means, which may be a DC/DC converter, by a clocked switching on and off of a switch S of the converter (see FIG. 4) in the time period T2, may execute an energy transmission from the first storage capacitor S1 to the second storage capacitor S2. The clocked switching on and off may for example be executed with a frequency of 100 kHz.

When reaching a second potential threshold value P2 or a second voltage threshold value U2, the control means in FIG. 5b may then deactivate the converter means, so that in this time period T1 no active energy transmission from S1 to S2 and no clocked switching on and off of the switch S of the DC/DC converter takes place. During this time period T1, the first storage capacitor S1 may be supplied with energy from an energy source 5 and the potential form at S1 may again reach the potential threshold value P1.

In the following, the control means circuit and its functioning is described. The control means 10b (FIG. 5b) is coupled to an input voltage $U_E$ which may correspond to the voltage $U_E(t)$ (see FIG. 1) that may be tapped at the storage capacitor S1. A diode, e.g. a Schottky diode 53 is connected to a transistor 54 so that the anode terminal 53a of the Schottky diode 53 is coupled to a first terminal 54a of a transistor 54. The cathode terminal 53b of the Schottky diode is on the one hand coupled to the control terminal 54b of the transistor 54 and on the other hand to an RC member 56 comprising a resistance element 56a connected in parallel having a resistance R'1 and a capacity element 56b having a capacity value C'1. Between the anode terminal 53a of the Schottky diode 53 and the RC member 56 the input voltage $U_E$ is applied. The second terminal 54c of the conductive path of the transistor 54 is coupled to a further RC member 57. The RC member 57 further comprises a resistance element 57a connected in parallel to a capacity element 57b comprising a capacity value C'2. The resistance element 57a comprises a resistance of R'2. The voltage $U_{enable}$ applied between the two terminals of the RC member 57 may then be used to switch on a correspondingly connected converter, e.g. a DC/DC converter, as described above, in a time period T2 and switch the same off in a time period T2. The converter may for this purpose comprise a corresponding control input to which the voltage $U_{enable}$ is applied.

The input voltage $U_E$ switches through the Schottky diode 53 in forward direction when exceeding the threshold voltage of the Schottky diode, so that on the one hand the capacitor 56b is charged and on the other hand the transistor T54 becomes conductive, if the difference of the input voltage $U_E$ and the input voltage $U_E$ reduced by the threshold voltage at the control terminal 54b of the transistor 54 is greater than a threshold voltage of the transistor. When the transistor opens up starting from a threshold voltage which may for example correspond to the first threshold value voltage U1, the capacitor C2 57b is charged and at the output 58 of the control means 10b a corresponding voltage $U_{enable}$ is applied. A decrease of the voltage $U_E$ due to the transmission of the energy to the second storage capacitor after switching on the converter means by the control means 10b then, when reaching a second threshold voltage, which may correspond to the second threshold value voltage U2, again leads to switching off the transistor and thus to a decrease of the voltage $U_{enable}$ up to a switching off of the connected converter means. The RC members 56 and 57 may serve as delay members, i.e. for a temporal delay of the switching process at the DC/DC converter. I.e., e.g. when falling below a bottom threshold voltage of the circuit 10b, the converter means (DC/DC converter) is not directly switched off but remains active for some time due to the buffering effect of the RC members 56, 57.

Figure 6:
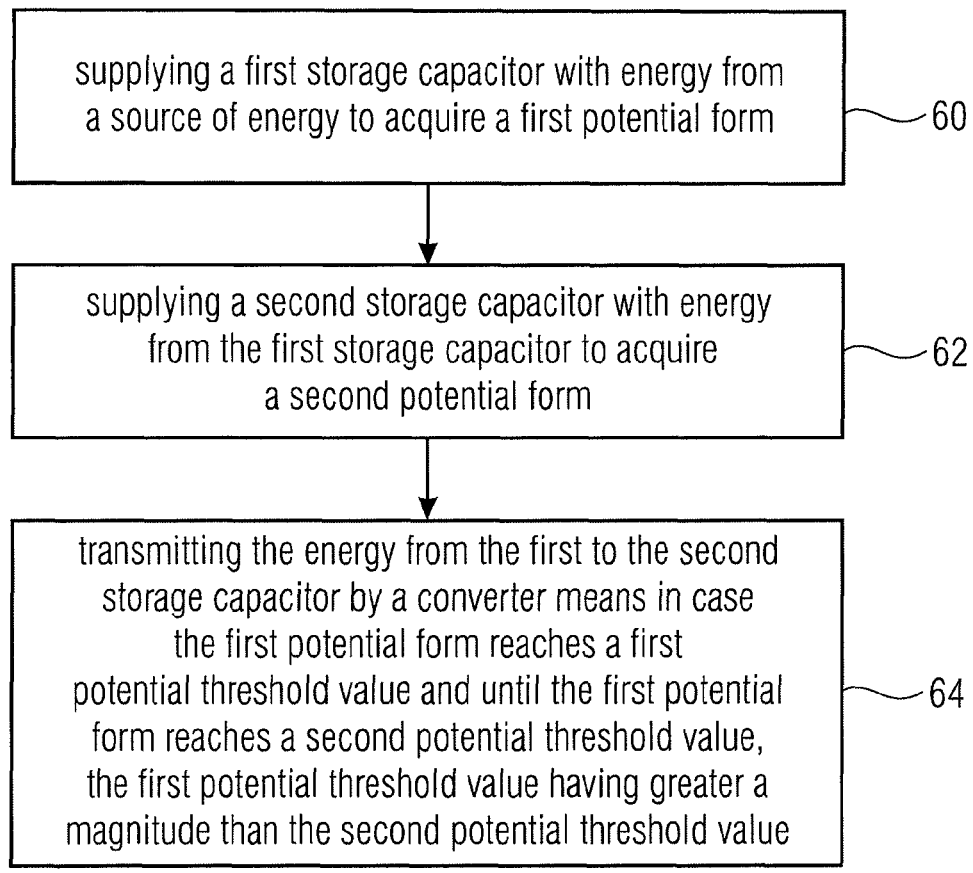
FIG. 6 shows a flowchart of the method for converting a potential in accordance with an embodiment of the present invention.

In FIG. 6, in a flow chart, an embodiment regarding a method for a potential conversion according to the present invention is illustrated. The method comprises supplying 60 a first storage capacitor S1 with energy from an energy source to obtain a first potential form at the first storage capacitor S1. Further, the method comprises supplying 62 a second storage capacitor S2 with energy from the first storage capacitor S1 to obtain a second potential form at the second storage capacitor S2. Apart from that, the method comprises transmitting 64 energy using a converter means electrically connected between the first and the second storage capacitor, from the first storage capacitor S1 to the second storage capacitor S2, if the first potential form reaches a first potential threshold value P1, and until the first potential form reaches a second potential threshold value P2, and wherein the first potential threshold value P1 is greater regarding its magnitude than the second potential threshold value P2.

The transmission 64 of energy using the converter means may in one embodiment, in addition to the method for potential conversion, comprise forming a greater maximum potential $P_2^{max}$ regarding its magnitude, at the storage capacitor S2, than a maximum potential $P_1^{max}$ at the storage capacitor S1, which is built up by a supply 60 of energy from the energy source. Thus, a maximum output voltage $U_A^{max}$ that may be tapped at the second storage capacitor S2 may be greater than a maximum input voltage $U_E^{max}$ that may be tapped at the first storage capacitor S1, with regard to a common reference potential.

The transmission 64 of energy with the converter means may, according to another embodiment, be terminated or the clock ratio of the energy transmission or conversion may be reduced or adapted to an energy consumption, if the second potential form at the second storage capacitor S2 reaches a third potential threshold value P3.

The transmission of energy from the first storage capacitor S1 to the second storage capacitor S2 with a converter means may comprise controlling the converter means with a control means.

In embodiments of the present invention, the method for a potential conversion may be executed so that the supply 60 of a first storage capacitor S1 with energy from an energy source is a charging of the first storage capacitor S1 in a first time period T1, whose starting time $t_{11}$ is given by reaching the second potential threshold value P2 and whose end time $t_{12}$ is given by reaching the first potential threshold value P2, in the first potential form. The transmission 64 of energy using the converter means may be a transmission of the energy only in a second time period T2 whose starting time $t_{21}$ is given by reaching the first potential threshold value $P_1$ and whose end time $t_{22}$ is given by reaching the second potential threshold value $P_2$, in the first potential form. The second time period T2 may here be shorter than the first time period T1, which is why the converter means only actively consumes electrical power during the shorter time period T2 and not during the longer first time period T1.

In embodiments of the present invention, the method is based on the fact, that in a certain time period energy is collected in a storage S1 which is then transmitted to the output side of a switching regulator or a potential converter device on a storage S2 many times faster or with a higher electrical power. At the same time, an up-conversion of the voltage may take place. Due to the energy transfer the voltage at the first storage S1 may decrease.

When reaching a lower potential threshold at the first storage capacitor S1, the converter means may terminate its operation for transmitting energy. During this time, the converter means may absorb no power. The complete energy of the energy source may then be used for feeding the first storage capacitor S1. When reaching an upper threshold or a first potential threshold value P1, the energy transmission 64 from the first into the second storage capacitor may again begin. After the transmission of the energy a pause may result in which the converter means or the switching regulator is inactive and consumes no power. By this, its portion of consumption with respect to the overall energy needed for potential conversion may reduce.

It is noted, that depending on the circumstances, the method for potential conversion may also be implemented in software. The implementation may be on a digital storage medium, in particular a floppy disk, a CD or a DVD having electronically readable control signals, which may cooperate with a programmable computer system so that the corresponding method is executed. In general, the invention thus also consists in a computer program product having a program code stored on a machine readable carrier for executing the method when the computer program product runs on a computer. In other words, the invention may thus be realized as a computer program having a program code for executing the method, when the computer program product runs on a computer.

In embodiments of the present invention, the power management for energy sources is illustrated with a low continuous power output. With a very low energy yield of an energy source, it may happen that when using a switching regulator the same takes up virtually the same power in the operation as the energy source gives up. The inventive method may enable, despite these circumstances, to feed an electric load via a voltage regulator. In embodiments of the present invention, the energy, for example the charge of an energy source, is initially buffered in a first storage S1, for example in a storage capacitor S1. For this purpose, the storage capacitor may be charged. A switching regulator or a converter means may be designed so that the same starts at the input, starting from a defined upper voltage threshold, to transfer the energy from the first storage at the input S1 into a second storage S2 at the output. According to the principle of a step-up converter, the second storage S2 may be charged to a higher voltage, which may for example be set at the converter by means of a feedback loop or means. Due to the energy transfer, the voltage at the first storage S1 may decrease. When reaching a lower threshold at the input, the switching regulator may terminate its operation. During this time, the regulator may not take up power. A complete energy of the source may flow into the first storage. When reaching the upper threshold, again the energy transmission from the first into the second storage starts. By the implementation of a top and a bottom threshold voltage, in the switching regulator a hysteresis performance results. Embodiments regarding the method for a potential conversion are based on the idea that in a certain time period T1 energy is collected in a storage S1 which is then transmitted many times faster in a shorter second time period, or with a higher power, to an output side of the switching regulator in a storage S2. Simultaneously, an up-conversion of the voltage may take place. After the transmission, a pause may result in which the switching regulator is inactive and no or only very little power is consumed. By this, its portion of consumption with regard to the overall energy is reduced. In this inactive time, the storage S1 may again collect energy from the source.

In embodiments, by the hysteresis performance the process for potential conversion may be divided into two phases. Collecting the energy from the source in the first storage S1, wherein the switching regulator is inactive in this time and this time period T1 comprises a longer time than a second time period T2, in which the transmission of the energy into the second storage S2 is executed. In this second time period T2 the switching regulator or the converter means is active and generates, on the output side, i.e. at the storage capacitor S2, a higher tappable voltage than at the input side, i.e. at the storage capacitor S1. The switching regulator or the converter means may thus for example be an up-converter. The transmission of the energy here takes place in a short temporal phase as compared to the long temporal phase in which the energy is transmitted from the energy source into the first storage S1 and/or collected there.

The method proposed here may need less energy, i.e. comprise a higher efficiency than conventional methods for potential conversion. Power consumption of the corresponding switching regulator—the potential converter device—may remain unchanged, but its energy consumption may clearly decrease, as it is only active for a short time during the energy transfer, i.e. the second time period T2. A continuous supply to a consumer is possible when the second storage S2 is suitably dimensioned and thus provides sufficient energy during the time in which no energy transfer takes place.

In the method for a potential conversion presented in the embodiments, the switching regulator or the converter means may achieve a clearly higher efficiency due to the higher power during the short-time transmission, as if the power of the source which is by far less is transmitted continuously. A load is mainly fed by a second storage S2. Here, of course, only as much energy may be taken as there is in the second storage S2.

In embodiments regarding the present invention, the inventive potential converter device and the method for converting a potential may also be used in an energy source with a low power output. The power output of this energy source may be continuous. For example, the energy source may be a piezo-converter or a thermo-generator. The electrical power output by the energy source may for example be between 0.01 mW and 1 W and advantageously e.g. between 0.1 mW and 0.1 W. The magnitude of the source voltage of such an energy source with a low power output may for example be between 1 mV and 5 V and e.g. advantageously between 10 mV and 1.5 V. Adapted to these values, the first threshold voltage value U1 may for example be between 1 mV and 5 V and advantageously e.g. between 10 mV and 1.5 V. The second threshold voltage value U2 may for example be between 0.1 mV and 5 V and advantageously between 1 mV and 1.5 V. In some embodiments, the ratio of the second threshold voltage value U2 to the first threshold voltage value U1 may be smaller than or equal to nineteen twentieth or even more extreme. The following may apply: U2/U1<19/20. The converted output voltage $U_A$ may for example be between 1 V and 5 V.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A potential converter device, comprising:
a first storage capacitor implemented to be supplied with energy from an energy source to acquire a first potential form at the first storage capacitor;
a second storage capacitor implemented to be supplied with energy from the first storage capacitor to acquire a second potential form at the second storage capacitor;
a converter electrically connected between the first and the second storage capacitors and implemented to execute an energy transmission from the first storage capacitor to the second storage capacitor if the first potential form reaches a first potential threshold value until the first potential form reaches a second potential threshold value, and wherein the first potential threshold value is greater regarding its magnitude than the second potential threshold value; and
a controller which is implemented to temporally control the energy transmission of the converter means from the first storage capacitor to the second storage capacitor by activating and deactivating the converter means, so that the first storage capacitor is charged in a first time period during which the converter means is deactivated and whose starting time is given by reaching the second potential threshold value and whose end time is given by reaching the first potential threshold value, in the first potential form, and wherein the converter means is implemented to execute the energy transmission only in a second time period during which the converter means is activated and whose starting time is given by reaching the first potential threshold value and whose end time is given by reaching the second potential threshold value, in the first potential form, wherein the ratio of the first time period to the second time period is greater than 5.

2. The potential converter device according to claim 1, wherein the converter means is implemented so that in the energy transmission from the first storage capacitor to the second storage capacitor the second potential form at the second storage capacitor reaches a maximum potential value, which is greater regarding its magnitude than a maximum potential value of the first potential form at the first storage capacitor, which is based on a supply with energy from the energy source.

3. The potential converter device according to claim 1, wherein the converter means is implemented to execute an energy transmission from the first storage capacitor to the second storage capacitor until the second potential form reaches a third potential threshold value.

4. The potential converter device according to claim 3, wherein the third potential threshold value, with regard to a reference potential, corresponds to an output voltage available to a load at the second storage capacitor.

5. The potential converter device according to claim 1, wherein the first potential threshold value corresponds to a first threshold voltage value of 1.0 V and the second potential threshold value corresponds to a second threshold voltage value of 0.3 V.

6. The potential converter device according to claim 1, wherein the ratio of the first time period to the second time period is between 10 and 500, between 100 and 400, greater than 5 or greater than 10.

7. The potential converter device according to claim 1, wherein the converter means is implemented as an up-converter, wherein an inductivity is connected to the first storage capacitor via a first terminal point and wherein the second terminal point of the inductivity is connected in parallel on the one hand to a switch connected to the reference potential and on the other hand to a diode switched in forward direction and connected to the second storage capacitor.

8. The potential converter device according to claim 1, further comprising a control means which is implemented, in the energy transmission from the first storage capacitor to the second storage capacitor, to form a second potential form at the second storage capacitor with a maximum potential value which is greater regarding its magnitude than a maximum potential value of the first potential form at the first storage capacitor, which is based on the supply with energy from the energy source.

9. The potential converter device according to claim 8, wherein the converter means comprises a switch switched on by the control means when reaching the first potential threshold value and switched off by the control means when reaching the second potential threshold value.

10. The potential converter device according to claim 1, wherein the converter means is implemented as a charge pump, a linear voltage regulator, a switching regulator, a switching power supply or a DC/DC converter.

11. The potential converter device according to claim 1, which is implemented so that a load may continuously be supplied with energy when, in the first time period, no energy transmission from the first storage capacitor to the second storage capacitor is executed by the converter means.

12. The potential converter device according to claim 1, wherein the energy source is implemented to provide an electric power of between 0.01 mW and 1 W.

13. The potential converter device according to claim 1, wherein the energy source comprises a piezo-converter or a thermal generator.

14. The potential converter device according to claim 1, wherein the energy source is implemented as an energy source with a continuous electric power output.

15. A method of potential conversion, comprising:
supplying energy from an energy source to a first storage capacitor in a first time period, whose starting time is given by reaching a second potential threshold value and whose end time is given by reaching a first potential threshold value, in the first potential form, to acquire a first potential form at the first storage capacitor;
supplying energy from the first storage capacitor to a second storage capacitor to acquire a second potential form at the second storage capacitor; and
transmitting the energy with a converter means electrically connected between the first and the second storage capacitor, from the first storage capacitor to the second storage capacitor, if the first potential form reaches a first potential threshold value and until the first potential form reaches a second potential threshold value, and wherein the first potential threshold value is greater regarding its magnitude than the second potential threshold value, wherein the transmission is executed in a second time period whose starting time is given by reaching the first potential threshold value and whose end time is given by reaching the second potential threshold value, in the first potential form,
wherein the converter means is deactivated during the first time period and activated during the second time period, and wherein the ratio of the first time period to the second time period is greater than 5.

16. The method according to claim 15, wherein the transmission of the energy with the converter means is forming a greater maximum potential value regarding its magnitude at the second storage capacitor than a maximum potential value at the first storage capacitor, which is based on the supply with energy from the energy source.

17. The method according to claim 15, wherein the transmission of the energy with the converter means is further executed until the second potential form reaches a third potential threshold value.

18. The method according to claim 15, wherein the first potential threshold value corresponds to a first threshold voltage value of 1.0 V and the second potential threshold value corresponds to a second threshold voltage value of 0.3 V.

19. The method according to claim 15, wherein the transmission of the energy is a transmission of a charge with a converter means which is implemented as a charge pump, a linear voltage regulator, a switching regulator, a switching power supply or a DC/DC converter.

20. The method according to claim 15, wherein the energy source outputs power of between 0.01 mW and 1 W.

21. The method according to claim 15, wherein the first memory capacitor is supplied with energy from a piezo converter or a thermal generator.

22. The method according to claim 15, wherein the energy source is implemented as an energy source with a continuous electric power output.

* * * * *

UNITED STATES PATENT AND TRADEMARK OFFICE
CERTIFICATE OF CORRECTION

PATENT NO. : 8,643,346 B2
APPLICATION NO. : 12/933055
DATED : February 4, 2014
INVENTOR(S) : Foerster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this
Twenty-ninth Day of September, 2015

Michelle K. Lee
*Director of the United States Patent and Trademark Office*